United States Patent
Imamoto et al.

(10) Patent No.: US 10,723,361 B2
(45) Date of Patent: Jul. 28, 2020

(54) MONITORING APPARATUS, COMMUNICATION SYSTEM, VEHICLE, MONITORING METHOD, AND NON-TRANSITORY STORAGE MEDIUM

(71) Applicant: Panasonic Intellectual Property Management Co., Ltd., Osaka (JP)

(72) Inventors: Yoshiharu Imamoto, Kanagawa (JP); Jun Anzai, Kanagawa (JP); Masato Tanabe, Aichi (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 437 days.

(21) Appl. No.: 15/879,758

(22) Filed: Jan. 25, 2018

(65) Prior Publication Data
US 2018/0229739 A1    Aug. 16, 2018

(30) Foreign Application Priority Data
Feb. 16, 2017   (JP) ................................. 2017-027280

(51) Int. Cl.
*B60W 50/04* (2006.01)
*H04W 4/48* (2018.01)
(Continued)

(52) U.S. Cl.
CPC ............ *B60W 50/04* (2013.01); *B60W 50/14* (2013.01); *H04L 9/0891* (2013.01); *H04L 9/3236* (2013.01); *H04L 9/3271* (2013.01); *H04L 12/40* (2013.01); *H04L 63/12* (2013.01); *H04L 63/1408* (2013.01); *H04W 4/48* (2018.02); *B60W 2050/021* (2013.01);
(Continued)

(58) Field of Classification Search
None
See application file for complete search history.

(56) References Cited

U.S. PATENT DOCUMENTS

| | | | |
|---|---|---|---|
| 2002/0026586 A1* | 2/2002 | Ito | H04L 63/08 713/183 |
| 2005/0229245 A1* | 10/2005 | Nakano | H04L 12/4625 726/14 |
| 2013/0227650 A1 | 8/2013 | Miyake | |

FOREIGN PATENT DOCUMENTS

JP         2012-104049         5/2012

* cited by examiner

*Primary Examiner* — Richard M Camby
(74) *Attorney, Agent, or Firm* — Greenblum & Bernstein, P.L.C.

(57) ABSTRACT

A monitoring apparatus includes a storage unit, a reception unit, a collation information generation unit, and a response unit. The storage unit stores a criterion for determining normality of a frame transmitted from a first electronic device. The reception unit receives the frame from a bus network. The collation information generation unit generates, when the reception unit receives a frame of a first identifier (ID) transmitted from the first electronic device, collation information which is information for collation with the criterion stored in the storage unit, based on the frame. The response unit transmits, when the reception unit receives a frame of a second ID transmitted from the second electronic device, information which is based on the criterion stored in the storage unit and the collation information generated by the collation information generation unit and which enables a check whether the first electronic device is valid, to the second electronic device.

8 Claims, 10 Drawing Sheets

(51) Int. Cl.
  *H04L 29/06*    (2006.01)
  *H04L 12/40*    (2006.01)
  *H04L 9/32*     (2006.01)
  *B60W 50/14*    (2020.01)
  *H04L 9/08*     (2006.01)
  H04L 29/08    (2006.01)
  H04L 12/26    (2006.01)
  B60W 50/02    (2012.01)

(52) U.S. Cl.
  CPC ........ *B60W 2050/046* (2013.01); *H04L 43/08* (2013.01); *H04L 63/08* (2013.01); *H04L 67/12* (2013.01); *H04L 2012/40215* (2013.01); *H04L 2012/40273* (2013.01); *H04L 2209/38* (2013.01); *H04L 2209/84* (2013.01)

FIG. 4

| MESSAGE ID | ECU-ID | PRESENCE/ABSENCE OF MAC VALUE | PRESENCE/ABSENCE OF COMMITMENT | TRANSMISSION CYCLE | NUMBER OF FRAMES | AUTHENTICATION ALGORITHM |
|---|---|---|---|---|---|---|
| ID1, ID2 | ECU1 | PRESENT | PRESENT | 10ms | 1000 | MAC + HASH CHAIN |
| ID3, ID4 | ECU2 | PRESENT | ABSENT | 20ms | 500 | MAC |
| ID5 | ECU3 | ABSENT | ABSENT | 30ms | 1000 | ABSENT |

MONITORING APPARATUS, COMMUNICATION SYSTEM, VEHICLE, MONITORING METHOD, AND NON-TRANSITORY STORAGE MEDIUM

The present application claims the benefit of foreign priority of Japanese patent application 2017-027280 filed on Feb. 16, 2017, the contents all of which are incorporated herein by reference.

BACKGROUND

1. Technical Field

The present disclosure relates to data processing technique, and particularly relates to a monitoring apparatus, a communication system, a vehicle, a monitoring method, and a computer program.

2. Description of the Related Art

In recent years, a vehicle is mounted with many electronic control units (hereinafter referred to as "ECUs"). A network that connects these ECUs is called an in-vehicle network. Many standards are present for the in-vehicle network, and among them a controller area network (CAN) is widely used.

An in-vehicle network system is proposed in which an ECU in the in-vehicle network determines whether another ECU as a request source for rewriting is valid, based on an authentication result with respect to the other ECU (for example, see Unexamined Japanese Patent Publication No. 2012-104049).

SUMMARY

The present disclosure provides a technique that efficiently inspects validity of an electronic device on a bus network.

A monitoring apparatus of one aspect of the present disclosure is connected to a first electronic device and a second electronic device that executes a process according to whether the first electronic device is valid, via the bus network. The monitoring apparatus includes a storage unit, a reception unit, a collation information generation unit, and a response unit. The storage unit stores a criterion for determining normality of a frame transmitted from the first electronic device. The reception unit receives the frame from the bus network. The collation information generation unit generates, when the reception unit receives a frame of a first identifier (ID) transmitted from the first electronic device, collation information which is information for collation with the criterion stored in the storage unit, based on the frame. The response unit transmits, when the reception unit receives a frame of a second ID transmitted from the second electronic device, information which is based on the criterion stored in the storage unit and the collation information generated by the collation information generation unit and which enables a check whether the first electronic device is valid, to the second electronic device.

Another aspect of the present disclosure provides a communication system. The communication system includes a first electronic device, a second electronic device that executes a process according to whether the first electronic device is valid, and a monitoring apparatus. The first electronic device, the second electronic device, and the monitoring apparatus are connected via a bus network. The monitoring apparatus includes a storage unit, a reception unit, a collation information generation unit, and a response unit. The storage unit stores a criterion for determining normality of a frame transmitted from the first electronic device. The reception unit receives the frame from the bus network. The collation information generation unit generates, when the reception unit receives a frame of a first ID transmitted from the first electronic device, collation information which is information for collation with the criterion stored in the storage unit, based on the frame. The response unit transmits, when the reception unit receives a frame of a second ID transmitted from the second electronic device, information which is based on the criterion stored in the storage unit and the collation information generated by the collation information generation unit and which enables a check whether the first electronic device is valid, to the second electronic device.

Still another aspect of the present disclosure provides a vehicle. The vehicle includes a first electronic device, a second electronic device that executes a process according to whether the first electronic device is valid, and a monitoring apparatus. The first electronic device, the second electronic device, and the monitoring apparatus are connected via an in-vehicle bus network. The monitoring apparatus includes a storage unit, a reception unit, a collation information generation unit, and a response unit. The storage unit stores a criterion for determining normality of a frame transmitted from the first electronic device. The reception unit receives the frame from an in-vehicle network. The collation information generation unit generates, when the reception unit receives a frame of a first ID transmitted from the first electronic device, collation information which is information for collation with the criterion stored in the storage unit, based on the frame. The response unit transmits, when the reception unit receives a frame of a second ID transmitted from the second electronic device, information which is based on the criterion stored in the storage unit and the collation information generated by the collation information generation unit and which enables a check whether the first electronic device is valid, to the second electronic device.

Still another aspect of the present disclosure provides a monitoring method. This method is executed by a monitoring apparatus. The monitoring apparatus is connected to a first electronic device and a second electronic device that executes a process according to whether the first device is valid, via the bus network. Further, the monitoring apparatus stores a criterion for determining normality of a frame transmitted from the first electronic device. The monitoring method includes receiving the frame from the bus network. Further, the monitoring method includes, when receiving a frame of a first ID transmitted from the first electronic device, generating collation information which is information for collation with a criterion, based on the frame. Further, the monitoring method includes transmitting, when receiving a frame of a second ID transmitted from the second electronic device, information which is based on the criterion and the collation information and which enables a check whether the first electronic device is valid, to the second electronic device.

Any desired combinations of the above described components and modifications of the features of the present disclosure in computer programs, recording media containing the computer programs, or other entities are still effective as other aspects of the present disclosure.

According to the present disclosure, validity of the electronic devices on the bus network can be efficiently inspected.

BRIEF DESCRIPTION OF THE DRAWINGS

FIG. 4 is a diagram illustrating an example of a monitoring criterion;

DETAILED DESCRIPTION

Prior to describing an exemplary embodiment of the present disclosure, problems found in a conventional technique will be now briefly described herein. When self-driving is made valid, a check must be made whether respective electronic control units (ECUs) on an in-vehicle network are in a normal state. Particularly in a technique disclosed in Unexamined Japanese Patent Publication No. 2012-104049, a security chip such as a trusted platform module (TPM) is necessarily mounted to the respective ECUs. As a result, a number of parts in the respective ECUs occasionally increases, and traffic in the in-vehicle network might increase.

Prior to describing a configuration according to the exemplary embodiment, an outline will be described. Before the self-driving is validated or invalidated, an inspection must be made as to whether an electronic system of a vehicle (in other words, an in-vehicle network) is in a normal state, for example, whether malware is not operating. In order to inspect whether an ECU on the in-vehicle network is in a normal state, attestation of a Trusted Computing Group (TCG) has been occasionally performed. The attestation is a technique for verifying integrity of a device based on a Hash value of software activated on the device.

However, in order to inspect whether a plurality of ECUs on the in-vehicle network is in the normal state, a module (for example, a security chip) to be a starting point of reliability such as TPM is necessarily mounted to each ECU. This causes an increase in a number of parts in each ECU and an increase in traffic in the in-vehicle network. Further, the attestation is for determining validity upon activation of an ECU, and thus the detection cannot be made when malware is included after the activation of the ECU.

Therefore, an exemplary embodiment proposes a monitoring apparatus that verifies validity of each ECU on an in-vehicle bus network. This monitoring apparatus monitors a message which is sent through a bus of the in-vehicle network in accordance with a monitoring rule, and responds to an attestation request in place of each ECU. That is, the exemplary embodiment provides a technique that enables a determination as to validity of each ECU connected to the bus, using the monitoring apparatus, as a starting point of reliability, that verifies the validity of each ECU based on "that each ECU connected to the bus performs communication in accordance with a predetermined message rule".

First Exemplary Embodiment

Figure 1:
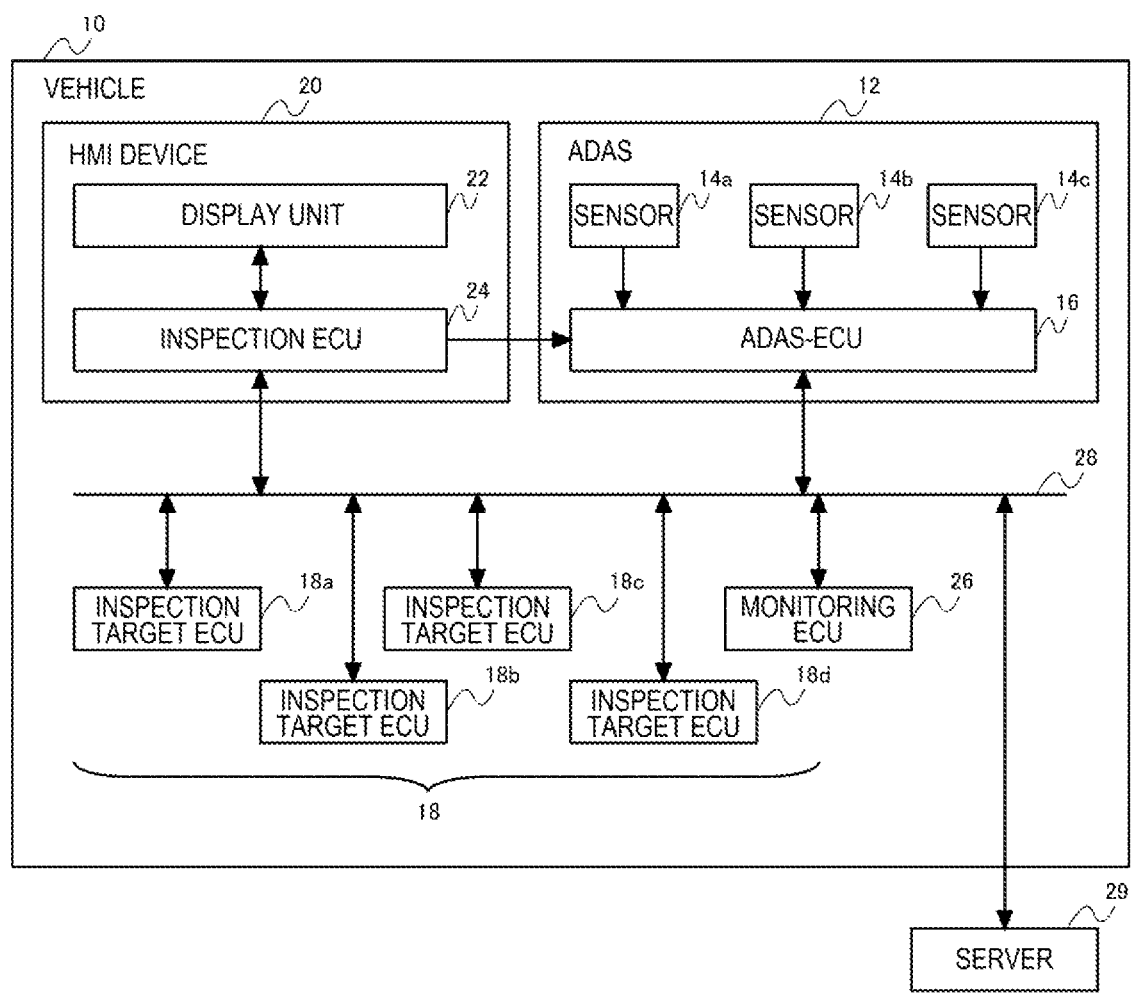
FIG. 1 is a diagram illustrating a configuration of a vehicle according to an exemplary embodiment.

FIG. 1 illustrates a configuration of vehicle 10 according to the exemplary embodiment. Vehicle 10 includes an advanced driver assistance systems (ADAS) 12, a human machine interface (HMI) device 20, inspection target ECU 18a, inspection target ECU 18b, inspection target ECU 18c, inspection target ECU 18d (generally referred to as "inspection target ECU 18"), and monitoring ECU 26. Respective devices in FIG. 1 are connected via controller area network (CAN) 28 which is an in-vehicle bus network, to configure an in-vehicle network system.

As described later, monitoring ECU 26 communicates with server 29 which is an information processing device provided outside the vehicle via CAN 28 and the Internet. A latest monitoring criterion for inspection target ECU 18 is registered in server 29. Server 29 provides the registered latest monitoring criterion to vehicle 10.

Each of a plurality of inspection target ECUs 18 is a target for control by ADAS 12 during self-driving of vehicle 10, and normality of each ECU must be inspected. The plurality of inspection target ECUs 18 may be, for example, an engine ECU, a brake ECU, a steering ECU, or a transmission ECU.

ADAS 12 is a system that controls the self-driving of vehicle 10. ADAS 12 includes a plurality of sensors including sensor 14a, sensor 14b, and sensor 14c, and ADAS-ECU 16. The plurality of sensors includes, for example, an acceleration sensor, a gyro sensor, a sonar, and a camera. ADAS-ECU 16 decides operation contents of a plurality of actuators in the self-driving based on input data from the plurality of sensors, and controls the plurality of inspection target ECUs 18 so that the actuators are operated in accordance with the determined contents.

HMI device 20 presents various information to an occupant of vehicle 10, and accepts an instruction input from the occupant of vehicle 10. HMI device 20 may be a car navigation device or an in-vehicle infotainment (IVI) device. HMI device 20 includes display unit 22 and inspection ECU 24. Display unit 22 includes a display and a lamp that display various information. Inspection ECU 24 is also referred to as an ADAS validating ECU. When the normality of inspection target ECU 18 is checked, inspection ECU 24 transmits an instruction for validating the ADAS (namely, starting the self-driving) to ADAS-ECU 16. Details of a function of inspection ECU 24 will be described later.

Monitoring ECU 26 monitors, based on a predetermined monitoring rule, a message which is sent through the bus of CAN 28 (also referred to as "frame" or "packet", hereinafter referred to as "frame"), and in place of inspection target ECU 18, responds to the attestation request from inspection ECU 24. Monitoring ECU 26 may be mounted as a dedicated device. Further, a monitoring module including the function of monitoring ECU 26 may be incorporated into an ECU of a central gate way (CGW) that relays a frame between a plurality of buses of CAN 28, or an ECU of a centralized monitoring and interceptor (CMI) that monitors a frame among the plurality of buses. In this case, the ECU of the CGW or the ECU of the CMI may operate as monitoring ECU 26. Details of a function of monitoring ECU 26 will be described later.

Figure 2:
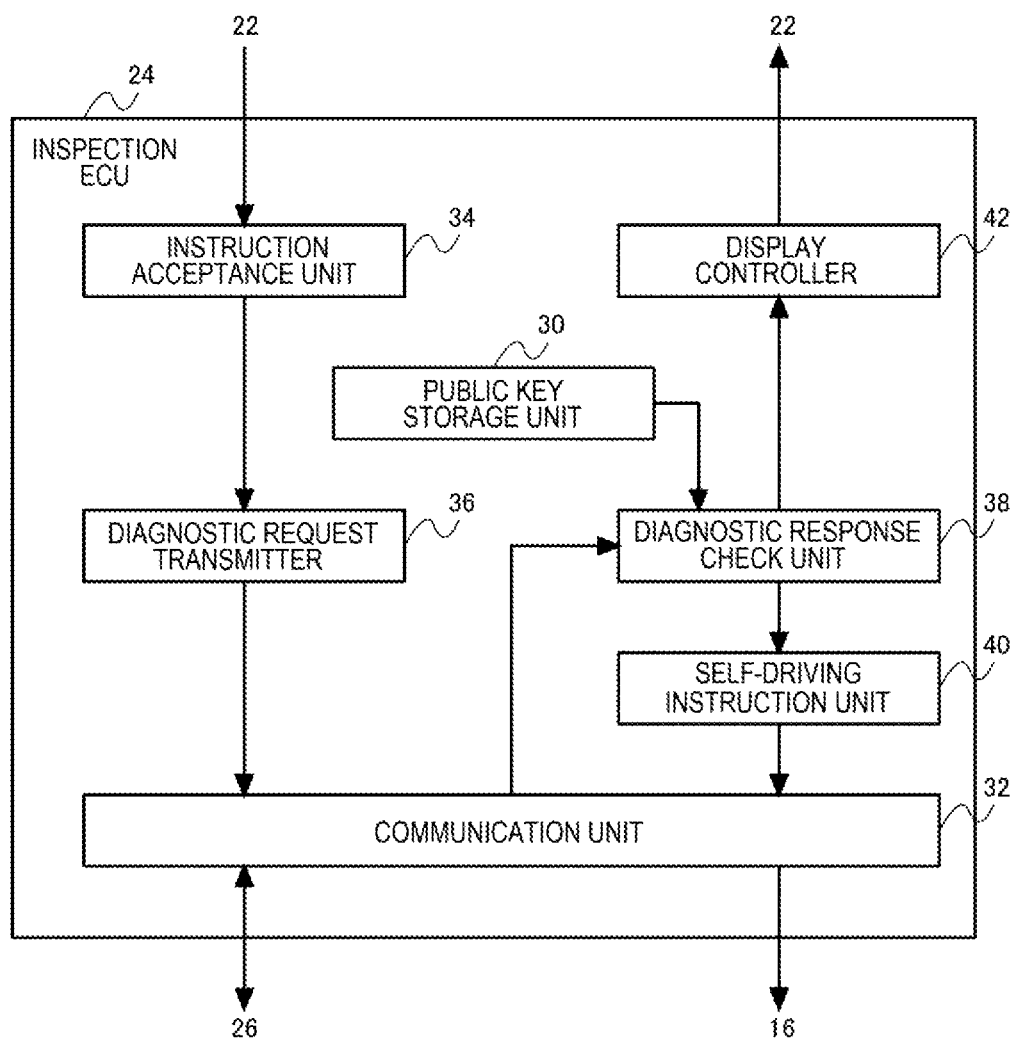
FIG. 2 is a block diagram illustrating a functional configuration of an inspection electronic control unit (ECU) illustrated in FIG. 1.

FIG. 2 is a block diagram illustrating a functional configuration of inspection ECU 24 illustrated in FIG. 1. Inspection ECU 24 includes public key storage unit 30, communication unit 32, instruction acceptance unit 34, diagnostic request transmitter 36, diagnostic response check unit 38, self-driving instruction unit 40, and display controller 42.

Blocks illustrated in the block diagrams of this specification can be achieved by, in terms of hardware, a central processing unit (CPU) of a computer, elements including a memory, and machine devices, and can be achieved by, in terms of software, computer programs and other programs. Here, functional blocks achieved through cooperation of the above described components are described. It will be understood by those skilled in the art that these functional blocks can be achieved in various forms through combinations of hardware and software. For example, computer programs including modules related to the respective blocks in FIG. 2 may be stored in a memory of inspection ECU 24. Functions of the blocks may be fulfilled in a manner that the CPU of inspection ECU 24 appropriately executes the computer programs.

Public key storage unit 30 stores a predetermined public key of monitoring ECU 26. Communication unit 32 communicates with external devices in accordance with a predetermined communication protocol. In the exemplary embodiment, communication unit 32 outputs a diagnostic request frame for monitoring ECU 26 to CAN 28, and receives a diagnostic response frame output from monitoring ECU 26 from CAN 28. Further, communication unit 32 transmits a message that instructs starting of the self-driving to ADAS-ECU 16. Note that inspection ECU 24 and ADAS-ECU 16 may be connected directly to each other as illustrated in FIG. 1 or may be connected via CAN 28.

Instruction acceptance unit 34 accepts an instruction from an occupant input via a predetermined button or a liquid crystal display. Self-driving instruction unit 40 transmits data for instructing the starting of the self-driving to ADAS-ECU 16 via communication unit 32. Display controller 42 controls display contents on display unit 22.

Diagnostic request transmitter 36 transmits a diagnostic request frame for checking the normality of inspection target ECU 18 to monitoring ECU 26 via communication unit 32. Diagnostic request transmitter 36 sets, in the diagnostic request frame, a message ID allocated to the diagnostic request frame in advance, and a challenge (a random value) dynamically generated. When instruction acceptance unit 34 accepts the instruction for starting the self-driving, diagnostic request transmitter 36 may transmit the diagnostic request frame to monitoring ECU 26.

Diagnostic response check unit 38 acquires data of a diagnostic response frame, which is a response to the diagnostic request frame, from communication unit 32. The diagnostic response frame includes diagnostic information indicating whether inspection target ECU 18 is normal, and signature by monitoring ECU 26. Diagnostic response check unit 38 verifies the diagnostic response frame based on the signature. In the exemplary embodiment, monitoring ECU 26 determines whether inspection target ECU 18 is normal, but in an exemplary modification, inspection ECU 24 may determine whether inspection target ECU 18 is normal.

The signature may be data obtained by encrypting a Hash value generated based on the challenge transmitted through the diagnostic request frame and the diagnostic information using a private key of monitoring ECU 26. Diagnostic response check unit 38 may acquire (1) data obtained by decoding the signature using the public key of monitoring ECU 26 stored in public key storage unit 30 and (2) a Hash value of data obtained by synthesizing the challenge transmitted through the diagnostic request frame and the diagnostic information of the diagnostic response frame. Diagnostic response check unit 38 may determine that the verification of the diagnostic response frame is successful (that is, the diagnostic response frame is not altered) when the data acquired in (1) and the Hash value acquired in (2) coincide with each other.

When the verification of the diagnostic response frame is successful, diagnostic response check unit 38 stores information relating to the validity of inspection target ECU 18 indicated by the diagnostic information, in other words, information relating to normality of CAN 28 in a predetermined storage area. Further, when the diagnostic information indicates that inspection target ECU 18 is valid, in other words, CAN 28 is normal, diagnostic response check unit 38 transmits the data that instructs starting of the self-driving from self-driving instruction unit 40 to ADAS-ECU 16. On the other hand, when the diagnostic information indicates that inspection target ECU 18 is abnormal, diagnostic response check unit 38 prohibits self-driving instruction unit 40 from transmitting the data that instructs the starting of the self-driving to ADAS-ECU 16.

Further, diagnostic response check unit 38 displays information relating to the validity of inspection target ECU 18 on a predetermined display or a lamp via display controller 42. For example, when the diagnostic information indicates that inspection target ECU 18 is valid, diagnostic response check unit 38 may display the validity on the display, or cause the predetermined lamp to glow in a first color (for example, green). Further, when the diagnostic information indicates that inspection target ECU 18 is abnormal, diagnostic response check unit 38 may display abnormality on the display or cause the predetermined lamp to glow in a second color (for example, red). Further, when diagnostic information is not yet acquired, namely, the validity of inspection target ECU 18 is unclear, diagnostic response check unit 38 may display the unclear state on the display, or cause the predetermined lamp to glow in a third color (for example, yellow).

Figure 3:
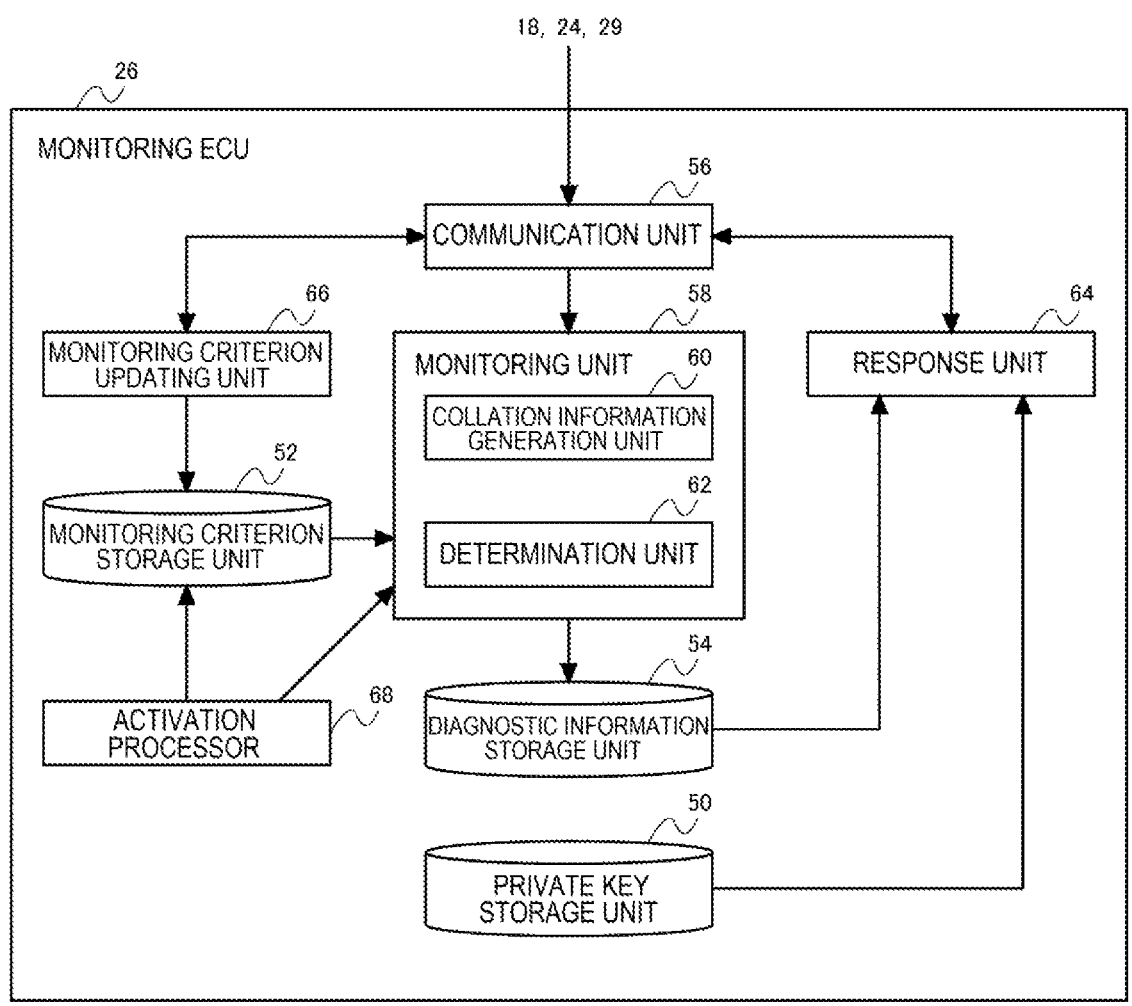
FIG. 3 is a block diagram illustrating a functional configuration of a monitoring ECU illustrated in FIG. 1.

FIG. 3 is a block diagram illustrating a functional configuration of monitoring ECU 26 illustrated in FIG. 1. Monitoring ECU 26 includes private key storage unit 50, monitoring criterion storage unit 52, diagnostic information storage unit 54, communication unit 56, monitoring unit 58, response unit 64, monitoring criterion updating unit 66, and activation processor 68. Monitoring unit 58 includes collation information generation unit 60 and determination unit 62.

Private key storage unit 50 stores a predetermined private key of monitoring ECU 26. Monitoring criterion storage unit 52 stores a criterion for inspecting normality of frames transmitted from the plurality of inspection target ECUs 18 (also referred to as a rule or a condition for determination of normality, hereinafter referred to as "monitoring criterion"). FIG. 4 illustrates an example of the monitoring criterion. The monitoring criterion in the exemplary embodiment is data in which a normal state of traffic of CAN 28 is defined. The monitoring criterion includes a message ID (also referred to as a frame ID or a CAN-ID), an ID of inspection target ECU 18 which is a frame transmission source, presence/absence of a message authentication code (MAC)

value, presence/absence of a commitment, a transmission cycle, a number of frames, and an authentication algorithm.

The commitment is data which is collated with a Hash value added to a frame when authentication is performed by a Hash chain. For example, when a Hash value as a result of repeating a Hash operation on certain data n times (n is a positive integer) is added to the frame transmitted from inspection target ECU 18a, the commitment may be a Hash value as a result of repeating the Hash operation on the certain data transmitted from inspection target ECU 18a in advance n+1 times. Since a Hash function has one-wayness, when the result of executing the Hash operation on the Hash value added to the frame one time coincides with the commitment, it is ensured that the transmission device of the commitment is identical to the transmission device of the frame. When the commitment is "present", monitoring criterion storage unit 52 relates the commitment with the message ID to separately store the commitment.

The transmission cycle is a time from reception of a previous frame of a certain message ID to reception of a next frame of that message ID. The transmission cycle may be any one of an average cycle, a lower-limit cycle, and an upper-limit cycle. The number of frames is a number of frames to be received per unit time (for example, 10 seconds).

Note that items of the monitoring criterion illustrated in FIG. 4 are examples. For example, the monitoring criterion may include items of frame contents such as items that define a range and an upper limit of data indicating traveling (or operation) modes of vehicle 10. Further, the monitoring criterion may include an item that defines a relationship with contents of another frame received in the past (such as a vehicle traveling mode). In other words, the monitoring criterion may include items that define combinations of contents of a plurality of frames and state transition. For example, the monitoring criterion may include an item that defines a range of a steering angle which indicates a normal state during high-speed traveling. Further, the monitoring criterion may include a statistics state not illustrated in FIG. 4.

Returning to FIG. 3, diagnostic information storage unit 54 stores diagnostic information including a determined result obtained by determination unit 62, described later. The diagnostic information may include information indicating whether an abnormal ECU is present among the plurality of inspection target ECUs 18, for example, whether there is any ECU that makes communication deviated from the monitoring criterion due to presence of malware. Further, the diagnostic information may include at least one of an ID of an ECU and an ID of a frame determined as abnormal. Further, the diagnostic information may include information indicating a normal state of CAN 28 (namely, all inspection target ECUs 18 are normal), or information indicating an abnormal state of CAN 28 (at least one of inspection target ECUs 18 is abnormal).

Communication unit 56 receives a frame which is sent through CAN 28 from the bus of CAN 28. Further, communication unit 56 outputs a diagnostic response frame output from response unit 64 to the bus of CAN 28.

When the frame received by communication unit 56 is a frame transmitted from any one of the plurality of inspection target ECUs 18, namely, a frame including an ID defined by the monitoring criterion, monitoring unit 58 identifies the received frame as an inspection target frame. Monitoring unit 58 collates the inspection target frame with the monitoring criterion related to a message ID of the frame.

Monitoring unit 58 includes collation information generation unit 60 and determination unit 62. Collation information generation unit 60 generates collation information which is information for collation with the monitoring criterion, based on data of the inspection target frame. Determination unit 62 collates the collation information generated by collation information generation unit 60 with the monitoring criterion related to the message ID of the inspection target frame to determine whether inspection target ECU 18 which is the transmission source of the inspection target frame is valid.

Collation information generation unit 60 according to the exemplary embodiment generates, for the inspection target frame, collation information including following (1) to (6): (1) whether the frame includes a MAC value; (2) whether the frame includes a commitment (a Hash value of a Hash chain); (3) a time interval from reception of a frame with identical ID in the past; (4) a number of received frames with identical ID per unit time; (5) a result of MAC authentication (message authentication) when the frame includes a MAC value; and (6) a result of Hash chain authentication when the frame includes a Hash value of a Hash chain.

When all conditions described below are satisfied, determination unit 62 according to the exemplary embodiment determines that inspection target ECU 18 which is the transmission source of the inspection target frame is normal (in other words, valid). When at least one of the conditions is not satisfied, determination unit 62 determines that inspection target ECU 18 is abnormal. In an exemplary modification, also when an unknown ECU is detected, namely, a frame that does not satisfy the conditions is received, determination unit 62 may determine that the unknown ECU is abnormal.

The conditions that are essential in the exemplary embodiment include following four conditions that: (1) when the monitoring criterion includes presence of a MAC value, the inspection target frame includes a MAC value; (2) when the monitoring criterion includes presence of a commitment, the inspection target frame includes a Hash value of a Hash chain; (3) a difference between the time interval from the reception of a frame with identical ID in the past and a transmission cycle of the monitoring criterion is within a predetermined range; and (4) a difference between the number of received frames with identical ID per unit time and a number of frames in the monitoring criterion is within a predetermined range. Determination unit 62 performs a measurement until a time when the determination is made that the frame which is sent through CAN 28 is in a valid state.

The above conditions (3) and (4) may be conditions that the differences are a value of the monitoring criterion or more, or the differences are the value of the monitoring criterion or less. Further, a range of normality or a range of abnormality may be defined in the monitoring criterion. When an authentication algorithm of the monitoring criterion includes MAC, a condition that (5) MAC authentication is successful is added. Further, when the authentication algorithm of the monitoring criterion includes a Hash chain, a condition that (6) Hash chain authentication based on the Hash value of the inspection target frame and the commitment stored in advance is successful is added. Further, a condition of (7) transition or correlation of the operating state observed based on a CAN-ID, and a condition that (8) a frame received by an ECU is a normal response may be added. The determination of the abnormal state may be made by using some of the conditions (1) to (8), and these conditions can be freely combined.

Determination unit 62 stores diagnostic information indicating a determined result for the inspection target frame in diagnostic information storage unit 54. When determining that inspection target ECU 18 which is a transmission source of the inspection target frame is normal, determination unit 62 records diagnostic information indicating that the inspection target ECU 18 is normal (in other words, valid). Further, when determining that inspection target ECU 18 which is a transmission source of the inspection target frame is abnormal, determination unit 62 records diagnostic information indicating that inspection target ECU 18 is abnormal.

When a frame received by communication unit 56 is a frame to which an ID allocated to a diagnostic request frame is given, response unit 64 identifies this frame as the diagnostic request frame transmitted from inspection ECU 24. Response unit 64 transmits, as a response to the diagnostic request frame, diagnostic information which is based on the monitoring criterion of monitoring criterion storage unit 52 and collation information generated by collation information generation unit 60 and which enables a check whether inspection target ECU 18 is valid (in other words, normal), to inspection ECU 24. When receiving the diagnostic request frame, response unit 64 according to the exemplary embodiment outputs the diagnostic response frame including the diagnostic information stored in diagnostic information storage unit 54 from communication unit 56 to CAN 28.

Response unit 64 adds a signature to the diagnostic information frame Specifically, response unit 64 inputs data obtained by synthesizing a challenge added to the diagnostic request frame with the diagnostic information into a predetermined Hash function to obtain a Hash value. Response unit 64 adds data that is obtained by encrypting the Hash value using the private key of monitoring ECU 26 stored in private key storage unit 50 as the signature to the diagnostic information frame.

When the predetermined conditions are satisfied, monitoring criterion updating unit 66 cooperates with server 29 to update the monitoring criterion stored in monitoring criterion storage unit 52. Updating timing of the monitoring criterion in the exemplary embodiment is when (1) new inspection target ECU 18 is added, (2) firmware of monitoring ECU 26 or inspection target ECU 18 is updated, and (3) maintenance is performed on vehicle 10. When automatically determining that the updating timing has arrived or an instruction for updating the monitoring criterion is received from an external device (a terminal of a maintenance worker connected to vehicle 10), monitoring criterion updating unit 66 accesses to server 29 to download the latest monitoring criterion.

As to the automatic detection of the updating timing, for example, when receiving a frame to which a new message ID undefined in the monitoring criterion is added, monitoring criterion updating unit 66 may detect that new inspection target ECU 18 is added and may access to server 29.

Activation processor 68 performs publicly-known secure boot upon activation of monitoring ECU 26. Further, activation processor 68 verifies both a monitoring module (for example, a module of monitoring unit 58) and the monitoring criterion stored in monitoring criterion storage unit 52 based on the signature. For example, activation processor 68 verifies whether a Hash value generated from data of the program of monitoring unit 58 coincides with a Hash value indicated by the signature, and whether a Hash value generated from data of the monitoring criterion coincides with the Hash value indicated by the signature. Under a condition that both of them coincide, the activation of monitoring ECU 26 may be completed normally. As a result, the completion of monitoring ECU 26 at the activation time can be established.

Instead of the above process or in addition to the above process, activation processor 68 may store the Hash value generated from the data of the program of monitoring unit 58 in a storage area (platform configuration register: PCR) in TPM which is mounted to monitoring ECU 26 and in which rewriting is enabled only by a special updating operation. Further, activation processor 68 may store the Hash value generated from the data of the monitoring criterion in the PCR. As a result, the validity of the monitoring module and the monitoring criterion in monitoring ECU 26 can be verified in an external device. Note that activation processor 68 may perform trusted boot instead of the secure boot.

Figure 5:
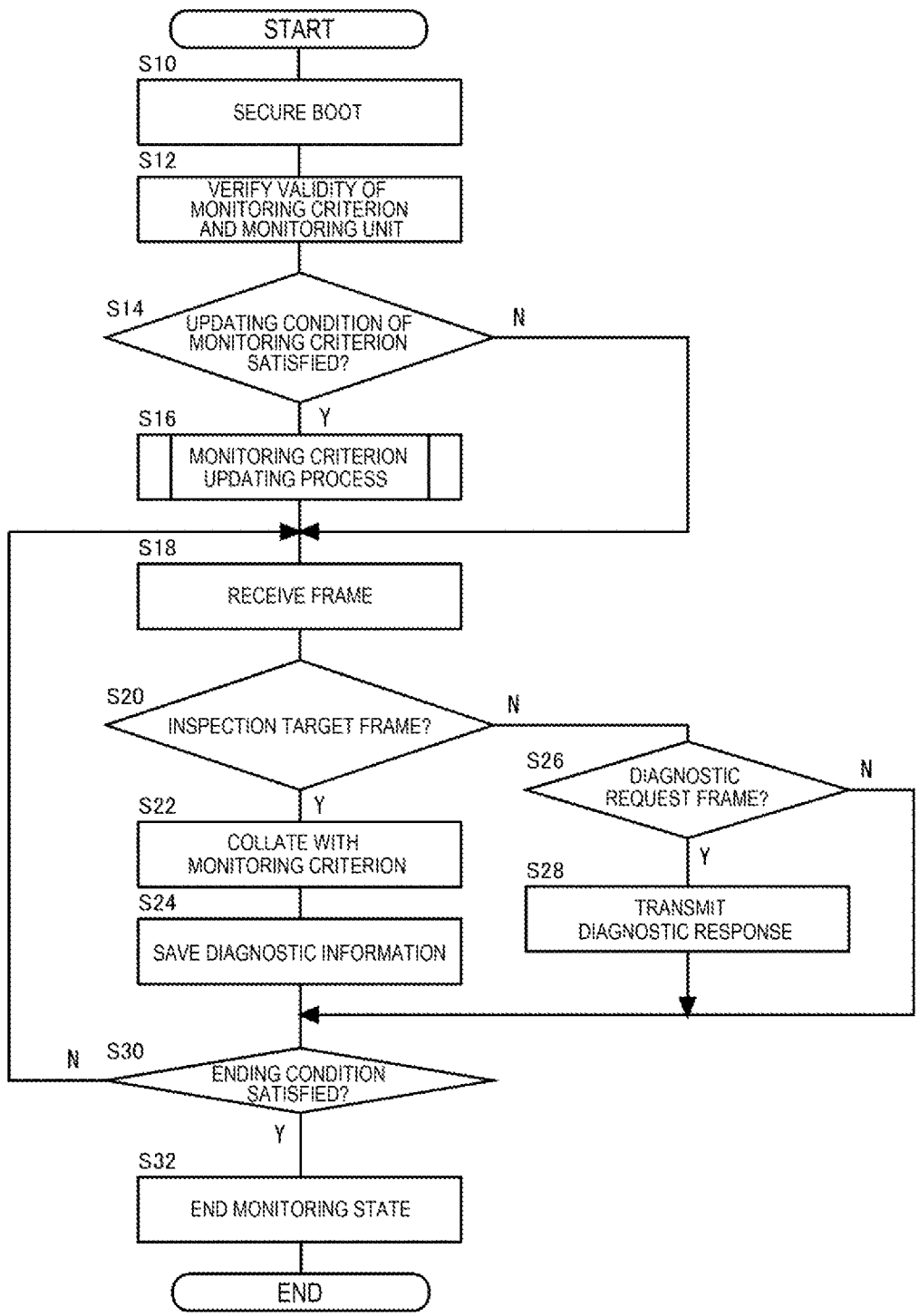
FIG. 5 is a flowchart illustrating an operation of the monitoring ECU.

Operations of monitoring ECU 26 and inspection ECU 24 having the above configuration will be described. FIG. 5 is a flowchart illustrating the operation of monitoring ECU 26. When an ignition of vehicle 10 is turned on and the power of monitoring ECU 26 is turned on, activation processor 68 performs secure boot (S10), and verifies the validity of monitoring unit 58 and the monitoring criterion (S12). If the updating conditions of the monitoring criterion are satisfied (Y in S14), monitoring criterion updating unit 66 executes a monitoring criterion updating process, described later (S16). If the predetermined conditions of the monitoring criterion are not satisfied (N in S14), S16 is skipped.

Communication unit 56 receives a frame from the bus of CAN 28 (S18). If the received frame is an inspection target frame (Y in S20), collation information generation unit 60 generates collation information based on the inspection target frame. Determination unit 62 collates a monitoring criterion related to the inspection target frame with the collation information to verify the validity of the inspection target frame. In other words, determination unit 62 verifies the validity of inspection target ECU 18 which is a transmission source of the inspection target frame (S22). Determination unit 62 saves a verified result of the validity of inspection target ECU 18 as diagnostic information in diagnostic information storage unit 54 (S24).

If the received frame is not an inspection target frame (N in S20) but is a diagnostic request frame (Y in S26), response unit 64 transmits the diagnostic response frame including the diagnostic information saved in diagnostic information storage unit 54 and the signature to inspection ECU 24 (S28). If the received frame is not the diagnostic request frame (N in S26), S28 is skipped. If the predetermined condition is satisfied (Y in S30), for example, if the power of monitoring ECU 26 is turned off, monitoring ECU 26 ends the monitoring state (S32), and the flow in FIG. 5 is ended. If the end condition is not satisfied (N in S30), the process returns to S18.

Figure 6:
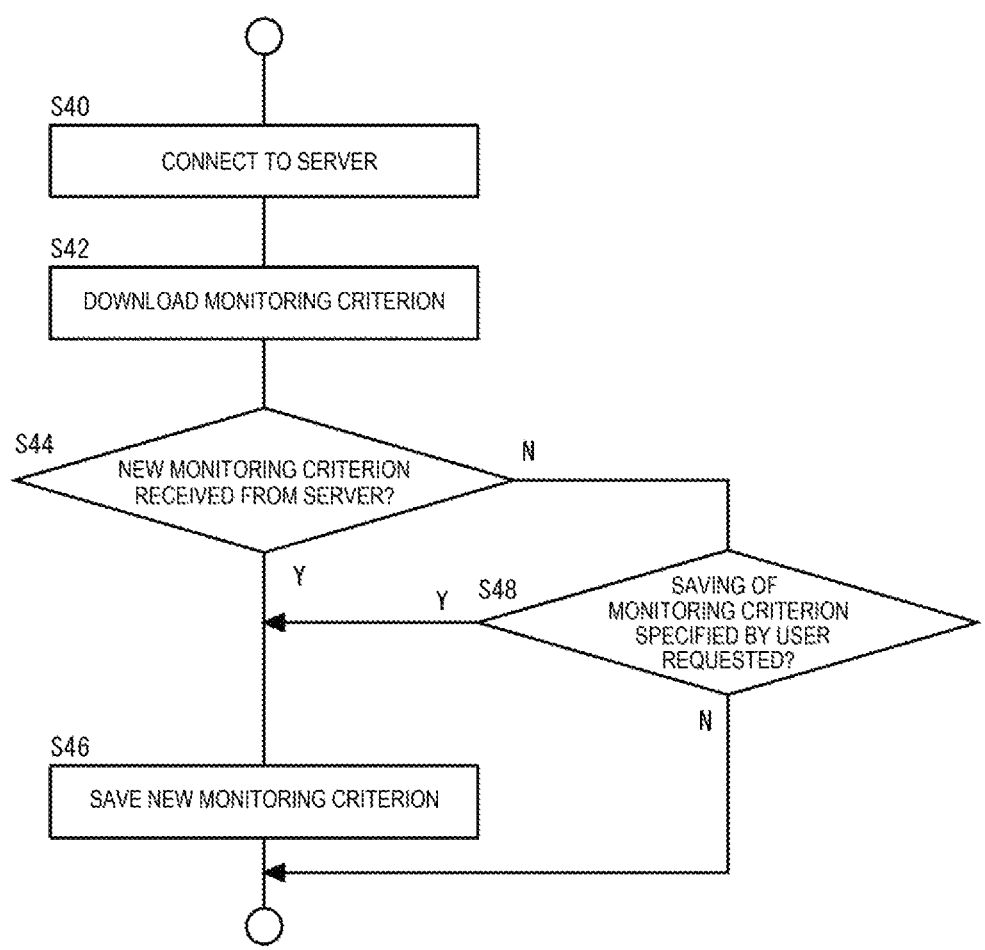
FIG. 6 is a flowchart illustrating details of a monitoring criterion updating process in step S16 in FIG. 5.

FIG. 6 is a flowchart illustrating details of a monitoring criterion updating process of S16 in FIG. 5. Monitoring criterion updating unit 66 makes a connection with server 29 (S40) and downloads a new monitoring criterion if server 29 has the new monitoring criterion (S42). The new monitoring criterion may be such that its creation date is more recent than the existing monitoring criterion already saved in monitoring criterion storage unit 52. If the new monitoring criterion is acquired from server 29 (Y in S44), monitoring criterion updating unit 66 saves the new monitoring criterion in monitoring criterion storage unit 52 to update the monitoring criterion (S46).

If the new monitoring criterion is not acquired from server 29 (N in S44) and a request for saving a monitoring criterion specified by a user is received (Y in S48), monitoring criterion updating unit 66 saves the monitoring criterion specified by the user in monitoring criterion storage unit 52 to update the monitoring criterion (S46). If the saving of a monitoring criterion specified by the user is not requested (N in S48), S46 is skipped. The monitoring criterion specified by the user may be a monitoring criterion originally created by the user (driver), or may be stored in a predetermined recording medium such as a secure digital (SD) card. Monitoring criterion updating unit 66 may read out the monitoring criterion from the recording medium, and store the monitoring criterion in monitoring criterion storage unit 52. In this case, the monitoring criterion created by the user is used for abnormality detection with self responsibility.

When a third-party device is added to vehicle 10, a monitoring criterion of that device may be added to monitoring criterion storage unit 52. In this case, when a signature is added to the monitoring criterion to be added by a vendor of the device or when no signature is added but the user performs a predetermined operation (such as pressing down a permission button), the monitoring criterion for the third-party device may be added to monitoring criterion storage unit 52.

Figure 7:
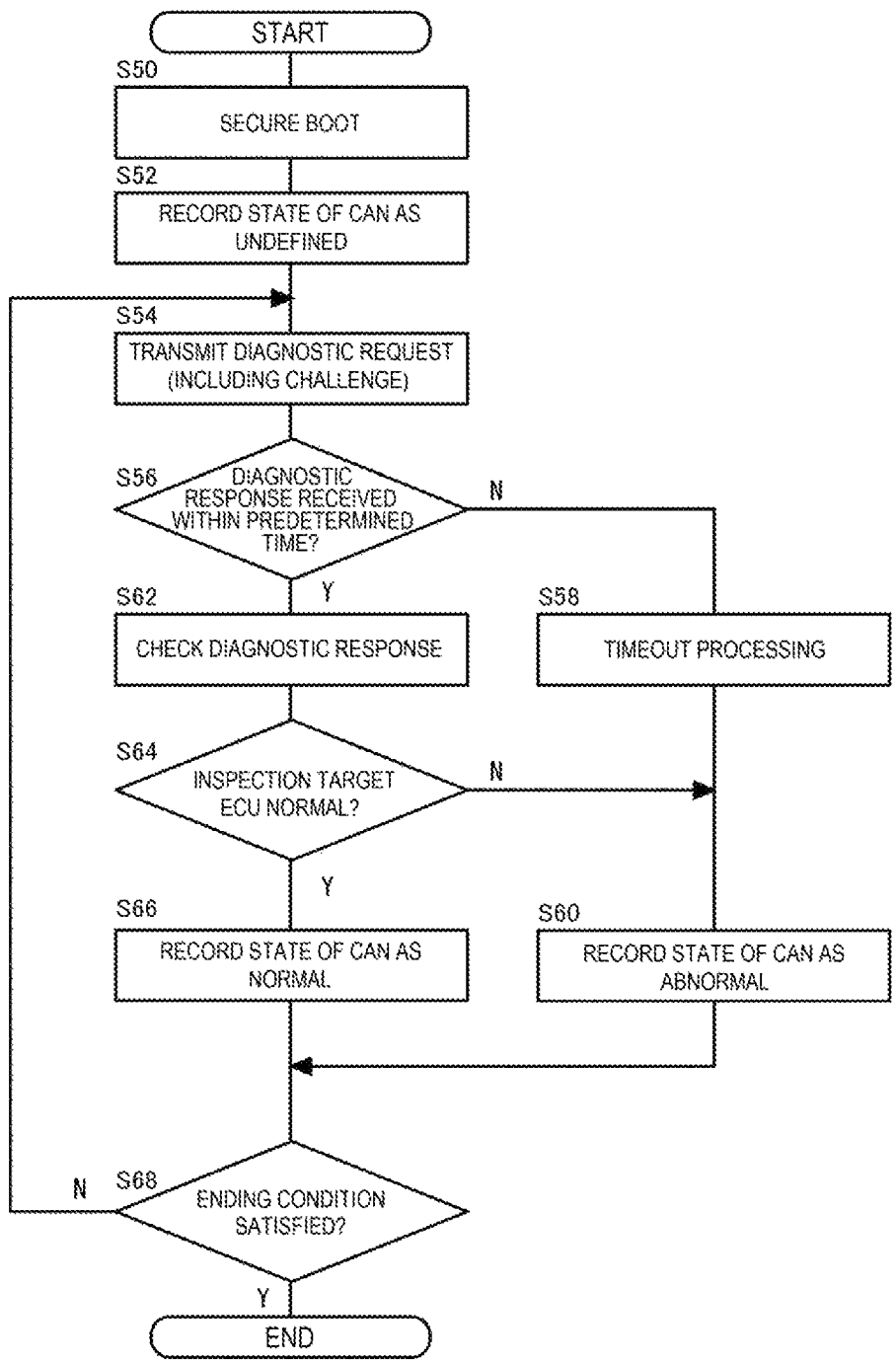
FIG. 7 is a flowchart illustrating an operation of the inspection ECU.
Figure 8:
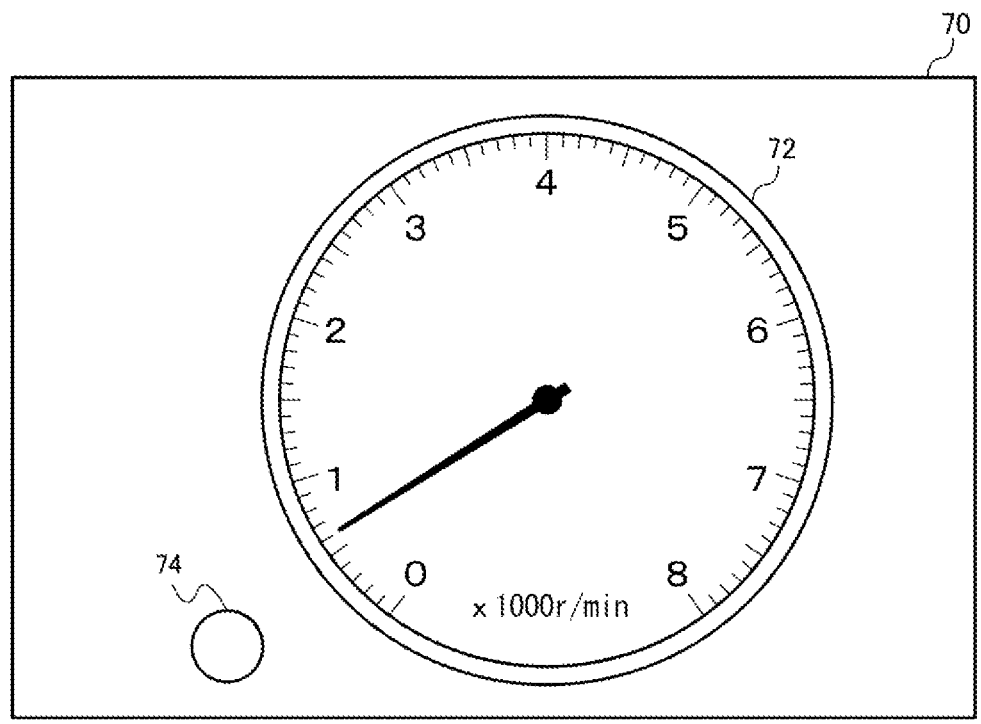
FIG. 8 is a diagram illustrating an example of a display unit.

FIG. 7 is a flowchart illustrating an operation of inspection ECU 24. When the power is on, inspection ECU 24 performs secure boot (S50). Since a diagnostic response is not received upon activation, diagnostic response check unit 38 records information indicating that the state of the CAN (in other words, inspection target ECU 18) is undefined in a predetermined storage area (a log or the like) (S52). Display controller 42 causes display unit 22 to display the information indicating that the state of the CAN is undefined. FIG. 8 illustrates an example of display unit 22. Lamp 74 may be provided as display unit 22 near tachometer 72 in dashboard 70. When the state of the CAN is undefined, display controller 42 may cause lamp 74 to glow in yellow.

Returning to FIG. 7, diagnostic request transmitter 36 transmits a diagnostic request frame including a challenge (a random value) to monitoring ECU 26 (S54). If the diagnostic response frame is not received within a predetermined time from the transmission of the diagnostic request frame (N in S56), diagnostic response check unit 38 executes a predetermined timeout process (S58) and records information indicating an abnormal state of the CAN in a predetermined storage area (S60). Display controller 42 causes display unit 22 to display the information indicating that the state of the CAN is abnormal. For example, display controller 42 may cause lamp 74 in FIG. 8 to glow in red.

If the diagnostic response frame is received within the predetermined time from the transmission of the diagnostic request frame (Y in S56), diagnostic response check unit 38 checks the diagnostic information in the diagnostic response frame (S62). If the diagnostic information indicates that inspection target ECU 18 is abnormal (N in S64), diagnostic response check unit 38 records information indicating that the state of the CAN (in other words, inspection target ECU 18) is abnormal in a predetermined storage area (S60). On the other hand, if the diagnostic information indicates that inspection target ECU 18 is normal (Y S64), diagnostic response check unit 38 records the information indicating that the state of the CAN is normal in a predetermined storage area (S66). Display controller 42 causes display unit 22 to display the information indicating the normal state of the CAN. For example, display controller 42 may cause lamp 74 in FIG. 8 to glow in green. When a predetermined end condition is satisfied (Y in S68), for example, if the power is turned off, the flow in FIG. 7 is ended. When the end condition is not satisfied (N in S68), the process returns to S54.

Although not illustrated in FIG. 7, if receiving the diagnostic response frame indicating that inspection target ECU 18 is normal (Y in S64) and the instruction for starting self-driving is accepted by instruction acceptance unit 34, self-driving instruction unit 40 transmits a signal indicating the instruction for starting self-driving to ADAS-ECU 16. Further, if the diagnostic information indicates that inspection target ECU 18 is abnormal (N in S64), even if instruction acceptance unit 34 accepts the instruction for starting an self-driving, self-driving instruction unit 40 suppresses transmission of the signal instructing to start self-driving to ADAS-ECU 16. When receiving the diagnostic information indicating the abnormality of inspection target ECU 18 after the instruction for starting the self-driving, self-driving instruction unit 40 may transmit the signal indicating the instruction for ending the self-driving to ADAS-ECU 16.

Figure 9:
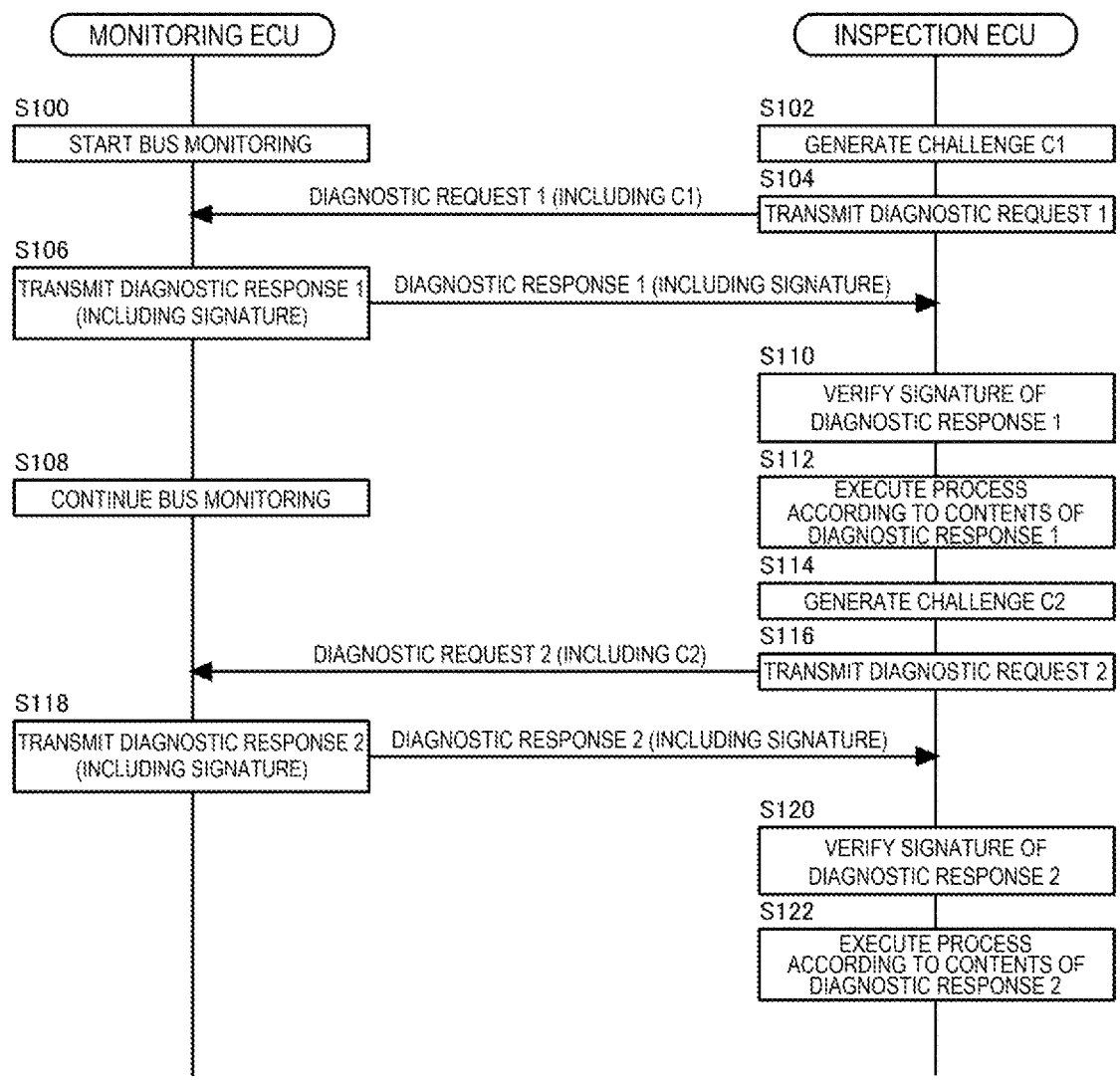
FIG. 9 is a sequence diagram illustrating an interaction between the monitoring ECU and the inspection ECU according to the exemplary embodiment.

FIG. 9 is a sequence diagram illustrating an interaction between monitoring ECU 26 and inspection ECU 24 according to the exemplary embodiment. Monitoring ECU 26 starts to monitor a frame which is sent through the bus of CAN 28 (S100). Inspection ECU 24 generates challenge C1 (S102) and transmits diagnostic request 1 including challenge C1 to monitoring ECU 26 (S104). Monitoring ECU 26 transmits diagnostic response 1, which includes diagnostic information indicating whether inspection target ECU 18 is normal and a signature, to inspection ECU 24 (S106). Monitoring ECU 26 continues to monitor the frame which is sent through the bus of CAN 28 (S108). Inspection ECU 24 verifies the signature of diagnostic response 1 (S110) and executes a process according to the diagnostic information of diagnostic response 1 (S112). That is, inspection ECU 24 selectively executes a first process in a case where inspection target ECU 18 is normal or a second process in a case where inspection target ECU 18 is abnormal.

After a predetermined time from S112, inspection ECU 24 generates challenge C2 (S114) and transmits diagnostic request 2 including challenge C2 to monitoring ECU 26 (S116). Monitoring ECU 26 transmits diagnostic response 2, which includes diagnostic information indicating whether inspection target ECU 18 is normal and a signature, to inspection ECU 24 (S118). Inspection ECU 24 verifies the signature of diagnostic response 2 (S120), and executes a process according to the diagnostic information of diagnostic response 2 (S122). Hereinafter, monitoring ECU 26 and inspection ECU 24 repeat the interaction illustrated in FIG. 9.

Monitoring ECU 26 according to the exemplary embodiment can verify the validity of inspection target ECU 18 from an outside of inspection target ECU 18 without mounting a security chip such as a TPM to inspection target ECU 18. As a result, a number of parts in inspection target ECU 18 can be reduced, and a development cost and a manufacturing cost of inspection target ECU 18 can be reduced.

Further, since monitoring ECU 26 monitors a message which is sent through CAN 28, after activation of inspection target ECU 18, monitoring ECU 26 can verify the validity of inspection target ECU 18 while inspection target ECU 18 is executing the data processing. As a result, even when malware is present in inspection target ECU 18 and inspection target ECU 18 inappropriately operates after activation of inspection target ECU 18, abnormality of inspection target ECU 18 can be detected.

The present disclosure has been described according to the exemplary embodiment. It will be understood by those skilled in the art that the exemplary embodiment is merely example, other exemplary modifications in which components and/or processes of the exemplary embodiment are variously combined are possible, and the other exemplary modifications will still fall within the scope of the present disclosure.

Figure 10:
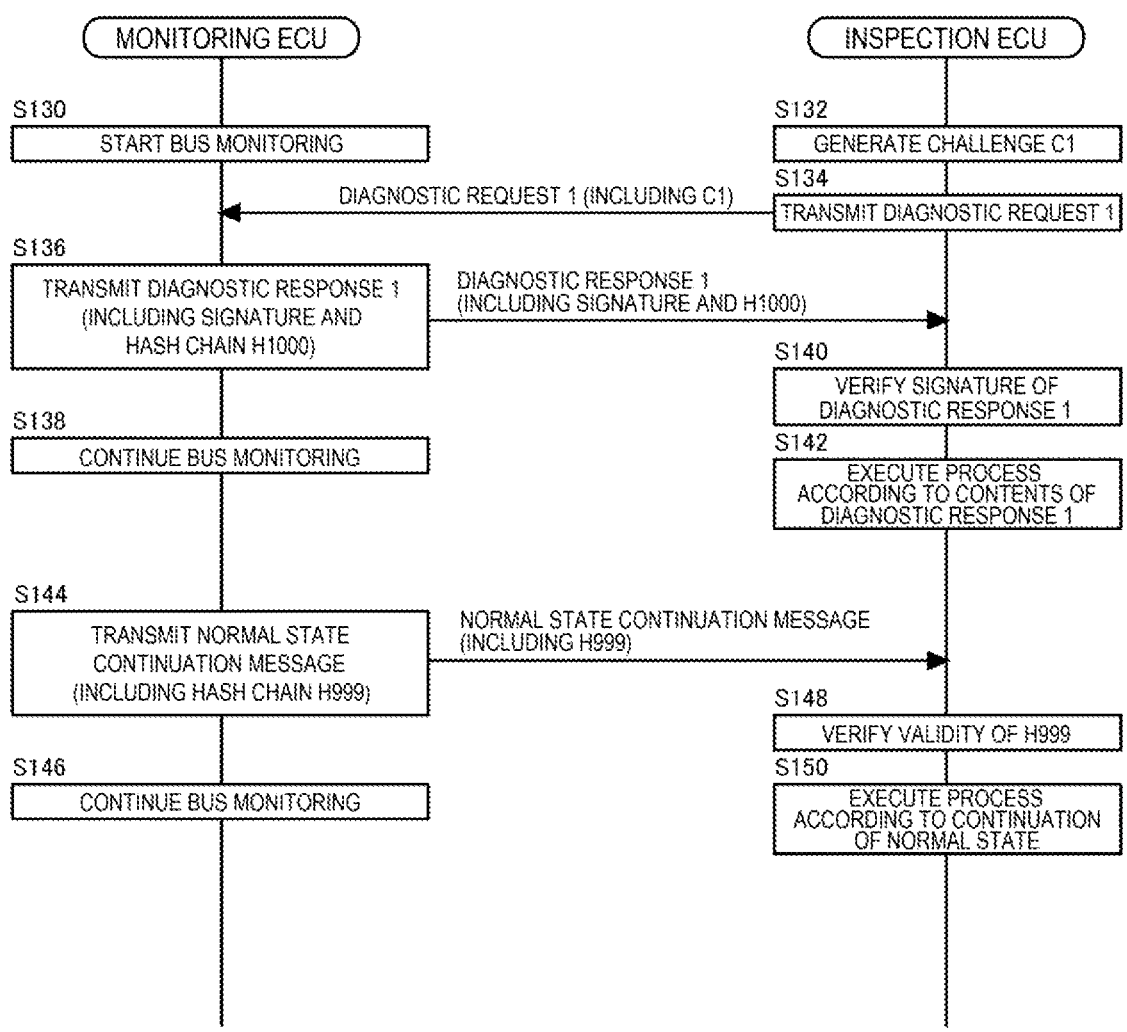
FIG. 10 is a sequence diagram illustrating an interaction between the monitoring ECU and the inspection ECU according to an exemplary modification.

An exemplary modification will now be described. During a period in which monitoring unit 58 does not detect abnormality of inspection target ECU 18, in other words, during a period in which diagnostic information indicating abnormality of inspection target ECU 18 is not generated, response unit 64 of monitoring ECU 26 may transmit data of a Hash chain indicating that inspection target ECU 18 is normal to inspection ECU 24 autonomously and periodically. FIG. 10 is a sequence diagram illustrating an interaction between monitoring ECU 26 and inspection ECU 24 according to an exemplary modification. Since steps S130 to S134 in FIG. 10 are identical to steps S100 to S104 in FIG. 9, the description thereof will be omitted.

Response unit 64 of monitoring ECU 26 transmits diagnostic response 1, which includes diagnostic information indicating whether inspection target ECU 18 is normal, a signature, and Hash data for a Hash chain (for example, a Hash operation on diagnostic information being repeated 1000 times, referred to as "H1000" herein), to inspection ECU 24 (S136). The subsequent steps S138 to S142 are equivalent to steps S108 to S112 in FIG. 9, but inspection ECU 24 stores H1000 added to diagnostic response 1 as a commitment.

When response unit 64 of monitoring ECU 26 detects that a predetermined time (for example, 3 minutes) has elapsed after S136, response unit 64 checks diagnostic information stored in diagnostic information storage unit 54 to check whether abnormality of inspection target ECU 18 is detected. When the normal state of inspection target ECU 18 is maintained, response unit 64 transmits a normal state continuation message including a Hash data for a Hash chain to inspection ECU 24 (S144). The Hash data is obtained by repeating the Hash operation on the diagnostic information transmitted in S136 999 times, and is referred to as "H999" herein. Further, the normal state continuation message can also be referred to as a frame of the CAN in which an ID indicating the message is set.

After the transmission of normal state continuation message, monitoring unit 58 of monitoring ECU 26 continues to monitor a frame which is sent through CAN 28 (S146). When receiving the normal state continuation message, diagnostic response check unit 38 of inspection ECU 24 verifies validity of H999 in the message (S148). Specifically, when a result of executing the Hash operation on H999 one time coincides with the result of H1000 stored as the commitment, diagnostic response check unit 38 determines that H999 is valid. Although no signature is added to the normal state continuation message, it is ensured by the Hash chain that a transmission source of the normal state continuation message is monitoring ECU 26. Diagnostic response check unit 38 executes a process according to the normal state of inspection target ECU 18 (S150).

Although not illustrated in FIG. 10, every time when the elapse of the predetermined time is detected after S144, response unit 64 of monitoring ECU 26 transmits a new normal state continuation message (including H998) to inspection ECU 24. Further, although not illustrated in FIG. 10, when abnormality of inspection target ECU 18 is detected, response unit 64 of monitoring ECU 26 stops the transmission of the normal state continuation message. At the same time, response unit 64 may immediately transmit the diagnostic response frame indicating the abnormality of inspection target ECU 18 to inspection ECU 24, regardless of whether the predetermined time has elapsed from the previous transmission of the normal state continuation message.

In this exemplary modification, a communication cost and a verification cost for a signature can be reduced in comparison with transmission/reception of data with a signature between inspection ECU 24 and monitoring ECU 26.

Another exemplary modification will now be described. This exemplary modification describes a configuration of monitoring ECU 26 in a case where inspection target ECU 18 which does not voluntarily transmit a frame (so-called read-only ECU, referred to as "special inspection target ECU" herein) is present in the plurality of inspection target ECUs 18. Monitoring unit 58 of monitoring ECU 26 further includes a request transmitter. The request transmitter transmits a request frame for requesting a predetermined response message (for example, an authentication message) to the special inspection target ECU.

As the monitoring criterion, contents (presence/absence of MAC) for inspecting normality of a response frame transmitted from the special inspection target ECU (for example, an authentication message) are defined. Determination unit 62 determines, in accordance with the monitoring criterion, the normality of the response frame transmitted from the special inspection target ECU in accordance with the request frame, to determine whether special inspection target ECU is valid. For example, the determination may be made, based on challenge response authentication, whether the special inspection target ECU is valid. According to this exemplary modification, the validity of inspection target ECU 18, which does not voluntarily transmit a frame, can be verified from the outside.

Still another exemplary modification will now be described. Although not described in the exemplary embodiment, monitoring ECU 26 may further include a monitoring criterion generation unit that generates a new monitoring criterion based on a reception status of a frame and a mode of a received frame. For example, when new inspection target ECU 18 which is to be controlled at the time of the self-driving is added to vehicle 10, monitoring ECU 26 receives a frame which is transmitted from new inspection target ECU 18 and includes an undefined ID in the monitoring criterion. At this time, the monitoring criterion generation unit may generate a new monitoring criterion including a monitoring criterion for this frame based on a format of the frame including the undefined ID in the monitoring criterion and a reception frequency. Monitoring criterion updating unit 66 uploads the new monitoring criterion generated by the monitoring criterion generation unit on server 29. When server 29 authenticates the new monitoring criterion, monitoring criterion updating unit 66 saves the new monitoring criterion in monitoring criterion storage unit 52 to replace the existing monitoring criterion with the new monitoring criterion.

Still another exemplary modification will now be described. In the above-described exemplary embodiment, monitoring ECU 26 has determined the validity of inspection target ECU 18. In the exemplary modification, inspection ECU 24 may determine the validity of inspection target ECU 18. Diagnostic response check unit 38 of inspection target ECU 18 may include a determination unit equivalent to determination unit 62 in the exemplary embodiment. Monitoring ECU 26 according to the exemplary modification provides information, which enables the check whether inspection target ECU 18 is valid, to inspection ECU 24.

Specifically, monitoring unit 58 of monitoring ECU 26 may successively store one or more inspection target frames with IDs defined in the monitoring criterion in a predetermined storage area (referred to as "frame storage unit"). When receiving the diagnostic request frame, response unit 64 of monitoring ECU 26 may transmit a diagnostic response frame including data of one or more inspection target frames stored in the frame storage unit and monitoring criteria related to IDs of the respective inspection target frames (referred to as "related monitoring criteria") to inspection ECU 24. A determination unit of inspection ECU 24 may determine the validity of inspection target ECU 18 which is a transmission source of an inspection target frame, based on the data of the inspection target frame and the related monitoring criterion.

The technique described in the above exemplary embodiment is not limited to an in-vehicle network system but can be applied widely to an apparatus and a system in which data is transmitted/received via a bus network such as a CAN, in other words, a network in which broadcasting communication is performed. For example, the technique can be widely applied to an apparatus and a system for a factory, a machine tool, and a robot.

The techniques described in the exemplary embodiment and the exemplary modifications may also be identified through items described below.

[Item 1]

A monitoring apparatus is connected to a first electronic device and a second electronic device that executes a process according to whether the first device is valid, via the bus network. The monitoring apparatus includes a storage unit, a reception unit, a collation information generation unit, and a response unit. The storage unit stores a criterion for determining normality of a frame transmitted from the first electronic device. The reception unit receives the frame from the bus network. The collation information generation unit generates, when the reception unit receives a frame of an ID transmitted from the first electronic device, collation information which is information for collation with the criterion stored in the storage unit, based on the frame. The response unit transmits, when the reception unit receives a frame of a second ID transmitted from the second electronic device, information which is based on the criterion stored in the storage unit and the collation information generated by the collation information generation unit and which enables a check whether the first electronic device is valid, to the second electronic device.

This monitoring apparatus can verify validity of the first electronic device as the inspection target from an outside of the first electronic device without mounting a security chip such as a TPM to the first electronic device.

Further, since the monitoring apparatus monitors a message which is sent through the bus network, the monitoring apparatus can verify the validity of the first electronic device even while the first electronic device is executing the data processing after activation.

[Item 2]

The monitoring apparatus may further include a determination unit that determines whether the first electronic device is valid by collating the collation information generated by the collation information generation unit with the criterion stored in the storage unit. The response unit may transmit a determined result of the determination unit as the information which enables the check whether the first electronic device is valid.

According to this aspect, since the monitoring apparatus determines the validity of the first electronic device, a processing load in the second electronic device can be reduced.

[Item 3]

The monitoring apparatus may further include an updating unit that updates the criterion stored in the storage unit in cooperation with an external server when a predetermined condition is satisfied.

According to this aspect, preferable contents can be maintained in the monitoring criterion for the frame transmitted from the first electronic device.

[Item 4]

A communication system includes a first electronic device, a second electronic device that executes a process according to whether the first electronic device is valid, and a monitoring apparatus. The first electronic device, the second electronic device, and the monitoring apparatus are connected via a bus network. The monitoring apparatus includes a storage unit, a reception unit, a collation information generation unit, and a response unit. The storage unit stores a criterion for determining normality of a frame transmitted from the first electronic device. The reception unit receives the frame from the bus network. The collation information generation unit generates, when the reception unit receives a frame of a first ID transmitted from the first electronic device, collation information which is information for collation with the criterion stored in the storage unit, based on the frame. The response unit transmits, when the reception unit receives a frame of a second ID transmitted from the second electronic device, information which is based on the criterion stored in the storage unit and the collation information generated by the collation information generation unit and which enables a check whether the first electronic device is valid, to the second electronic device.

According to this communication system, the validity of the first electronic device as the inspection target can be verified from an outside of the first electronic device without mounting a security chip such as a TPM to the first electronic device. Further, since the monitoring apparatus monitors a message which is sent through the bus network, the monitoring apparatus can verify the validity of the first electronic device even while the first electronic device is executing the data processing after activation.

[Item 5]

The second electronic device may cause a predetermined display device to display information indicating whether the first electronic device is valid. According to this aspect, a state of the first electronic device can be easily presented to a user.

[Item 6]

A vehicle includes a first electronic device, a second electronic device that executes a process according to whether the first electronic device is valid, and a monitoring apparatus. The first electronic device, the second electronic device, and the monitoring apparatus are connected via an in-vehicle bus network. The monitoring apparatus includes a storage unit, a reception unit, a collation information generation unit, and a response unit. The storage unit stores a criterion for determining normality of a frame transmitted from the first electronic device. The reception unit receives the frame from an in-vehicle network. The collation information generation unit generates, when the reception unit receives a frame of a first ID transmitted from the first electronic device, collation information which is information for collation with the criterion stored in the storage unit, based on the frame. The response unit transmits, when the reception unit receives a second ID frame transmitted from the second electronic device, information which is based on the criterion stored in the storage unit and the collation information generated by the collation information generation unit and which enables a check whether the first electronic device is valid, to the second electronic device.

According to this vehicle, the validity of the first electronic device as the inspection target can be verified from an outside of the first electronic device without mounting a security chip such as a TPM to the first electronic device. Further, since the monitoring apparatus monitors a message which is sent through a bus network, the monitoring apparatus can verify the validity of the first electronic device even while the first electronic device is executing the data processing after activation.

[Item 7]

A monitoring method is executed by a monitoring apparatus. A monitoring apparatus is connected to a first electronic device and a second electronic device that executes a process according to whether the first device is valid, via the bus network. Further, the monitoring apparatus stores a criterion for determining normality of a frame transmitted from the first electronic device. The monitoring method includes receiving the frame from the bus network. Further, the monitoring method includes generating, when receiving a frame of a first ID transmitted from the first electronic device, collation information which is information for collation with the criterion, based on the frame. Further, the monitoring method includes transmitting, when receiving a frame of a second ID transmitted from the second electronic device, information which is based on the criterion and the collation information and which enables a check whether the first electronic device is valid, to the second electronic device.

According to this monitoring method, the validity of the first electronic device as the inspection target can be verified from an outside of the first electronic device without mounting a security chip such as a TPM to the first electronic device. Further, since a message which is sent through a bus network is monitored in the monitoring method, the validity of the first electronic device can be verified even while the first electronic device is executing the data processing after activation.

[Item 8]

A non-transitory storage medium contains a computer program to be executed by a monitoring apparatus. The monitoring apparatus is connected to a first electronic device and a second electronic device that executes a process according to whether the first device is valid, via a bus network. Further, the monitoring apparatus stores a criterion for determining normality of a frame transmitted from the first electronic device. The computer program causes the monitoring apparatus to execute receiving the frame from the bus network. Further, the computer program causes the monitoring apparatus to execute generating, when receiving a frame of a first ID transmitted from the first electronic device, collation information which is information for collation with a criterion, based on the frame. Further, the computer program causes the monitoring apparatus to execute transmitting, when receiving a frame of a second ID transmitted from the second electronic device, information which is based on the criterion and the collation information and which enables a check whether the first electronic device is valid, to the second electronic device.

According to this non-transitory storage medium, the validity of the first electronic device as the inspection target can be verified from an outside of the first electronic device without mounting a security chip such as a TPM to the first electronic device. Further, since a message which is sent through a bus network is monitored by the computer program, the validity of the first electronic device can be verified even while the first electronic device is executing the data processing after activation.

Any desired combinations of the above described exemplary embodiment and the above described exemplary modifications are also useful as other exemplary embodiments of the present disclosure. Any new exemplary embodiments formed by such combinations include benefits of the exemplary embodiments and the exemplary modifications combined into the new exemplary embodiments. It will be understood by those skilled in the art that functions that should be carried out by components described in the appended claims can be achieved by each of or through cooperation of the components illustrated in the exemplary embodiment and the exemplary modifications.

The present disclosure is useful as a monitoring apparatus, a communication system, a vehicle, a monitoring method, and a non-transitory storage medium.

What is claimed is:

1. A monitoring apparatus that is connected to a first electronic device and a second electronic device via a bus network, the second electronic device executing a process according to whether the first electronic device is valid, the monitoring apparatus comprising:
    a storage unit that stores a criterion for determining normality of a frame transmitted from the first electronic device;
    a reception unit that receives the frame from the bus network;
    a collation information generation unit that generates, when the reception unit receives a frame of a first identifier (ID) transmitted from the first electronic device, collation information which is information for collation with the criterion stored in the storage unit, based on the frame; and
    a response unit that transmits, when the reception unit receives a frame of a second ID transmitted from the second electronic device, information which is based on the criterion stored in the storage unit and the collation information generated by the collation information generation unit and which enables a check whether the first electronic device is valid, to the second electronic device.

2. The monitoring apparatus according to claim 1, further comprising a determination unit that determines whether the first electronic device is valid by collating the collation information generated by the collation information generation unit with the criterion stored in the storage unit,
    wherein the response unit transmits a determined result of the determination unit as the information which enables the check whether the first electronic device is valid.

3. The monitoring apparatus according to claim 1, further comprising an updating unit that updates the criterion stored in the storage unit in cooperation with an external server when a predetermined condition is satisfied.

4. A communication system comprising:
    a first electronic device;
    a second electronic device that executes a process according to whether the first electronic device is valid; and
    a monitoring apparatus,
    the first electronic device, the second electronic device, and the monitoring apparatus being connected via a bus network,
    the monitoring apparatus including:

a storage unit that stores a criterion for determining normality of a frame transmitted from the first electronic device;

a reception unit that receives the frame from the bus network;

a collation information generation unit that generates, when the reception unit receives a frame of a first identifier (ID) transmitted from the first electronic device, collation information which is information for collation with the criterion stored in the storage unit, based on the frame;

a response unit that transmits, when the reception unit receives a frame of a second ID transmitted from the second electronic device, information which is based on the criterion stored in the storage unit and the collation information generated by the collation information generation unit and which enables a check whether the first electronic device is valid, to the second electronic device.

5. The communication system according to claim 4, wherein the second electronic device causes a predetermined display device to display information indicating whether the first electronic device is valid.

6. A vehicle comprising:

a first electronic device;

a second electronic device that executes a process according to whether the first electronic device is valid; and a monitoring apparatus;

the first electronic device, the second electronic device, and the monitoring apparatus being connected via an in-vehicle bus network, the monitoring apparatus including:

a storage unit that stores a criterion for determining normality of a frame transmitted from the first electronic device;

a reception unit that receives the frame from the in-vehicle bus network;

a collation information generation unit that generates, when the reception unit receives a frame of a first identifier (ID) transmitted from the first electronic device, collation information which is information for collation with the criterion stored in the storage unit, based on the frame; and a response unit that transmits, when the reception unit receives a frame of a second ID transmitted from the second electronic device, information which is based on the criterion stored in the storage unit and the collation information generated by the collation information generation unit and which enables a check whether the first electronic device is valid, to the second electronic device.

7. A monitoring method which is executed by a monitoring apparatus that is connected, via a bus network, to a first electronic device and a second electronic device that executes a process according to whether the first electronic device is valid, the monitoring apparatus storing a criterion for determining normality of a frame transmitted from the first electronic device, the monitoring method comprising:

receiving the frame from the bus network;

generating, when receiving a frame of a first identifier (ID) transmitted from the first electronic device, collation information which is information for collation with the criterion, based on the frame; and transmitting, when receiving a frame of a second ID transmitted from the second electronic device, information which is based on the criterion and the collation information and which enables a check whether the first electronic device is valid, to the second electronic device.

8. A non-transitory storage medium containing a computer program executed by a monitoring apparatus that is connected, via a bus network, to a first electronic device and a second electronic device that executes a process according to whether the first electronic device is valid and that stores a criterion for determining normality of a frame transmitted from the first electronic device, the computer program causing the monitoring apparatus to execute:

receiving the frame from the bus network;

generating, when receiving a frame of a first identifier (ID) transmitted from the first electronic device, collation information which is information for collation with the criterion, based on the frame; and transmitting, when receiving a frame of a second ID transmitted from the second electronic device, information which is based on the criterion and the collation information and which enables a check whether the first electronic device is valid, to the second electronic device.

* * * * *